United States Patent Office 3,178,870
Patented Apr. 20, 1965

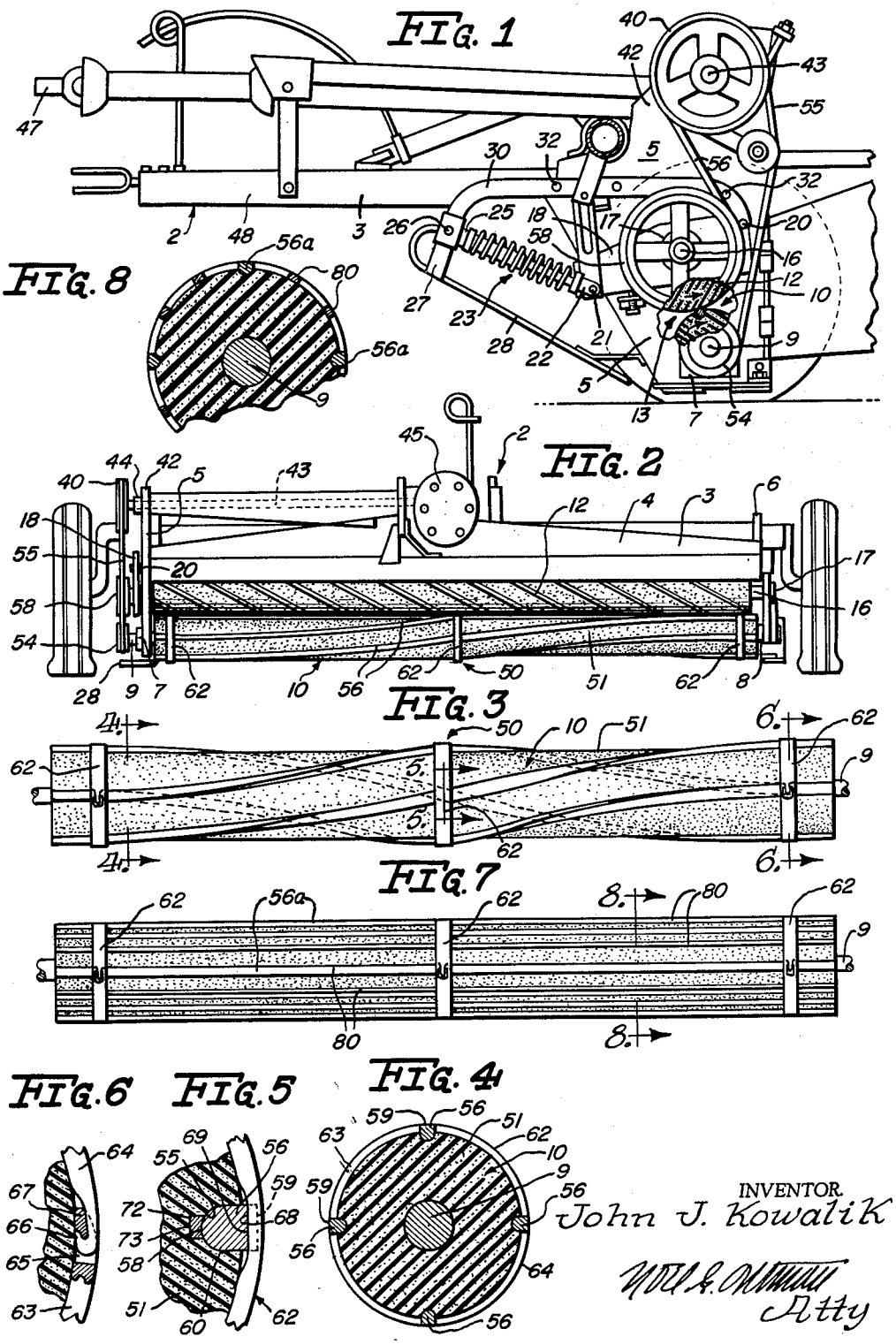

3,178,870
HAY CONDITIONER AND ROLL
CONSTRUCTION THEREFOR
John J. Kowalik, Glenview, Ill., assignor to International Harvester Company, Chicago, Ill., a corporation of New Jersey
Filed Nov. 13, 1962, Ser. No. 236,928
10 Claims. (Cl. 56—1)

This invention relates to hay conditioners of the type which comprise a pair of mating rolls which are adapted to receive hay therebetween and in pursuance to the passage of hay to crush the stems in order to accelerate the drying thereof and to make it more palatable for feed.

In general, the invention comprehends the provision of the hay conditioner comprising a pair of cooperating rolls wherein at least one roll comprises a series of rigid bars floatingly mounted on the roll and cooperable with the periphery of the other roll for the purpose of breaking the stems of hay passing therebetween.

A more specific object of the invention is to provide a novel structure which is adaptable for mounting on a roll of elastomer material, said structure comprising rigid bars encompassing the roll, said structure being alternatively readily removable from the roll or applicable thereto.

A further object of the invention is to provide a novel mechanism for converting a hay conditioner having a pair of cooperative rolls of elastomer material into a crimper having one roll with a series of rigid bars cooperating with the other roll of elastomer material.

The invention contemplates a novel mechanism for simply affecting attachment and detachment of the bars with respect to an associated roll.

The invention is particularly applicable wherein the machine is intended to operate under different harvesting conditions. Under certain conditions it has been found that the provision of rigid bars onto the periphery of a normally smooth-faced or grooved rubber roll, materially enhances the ability of the roll to pick up the material.

These and other objects and advantages of the invention will become more apparent from the specification and the drawings wherein:

FIGURE 1 is a side elevational view of a hay conditioner partly in section incorporating the instant invention;

FIGURE 2 is a rear elevational view;

FIGURE 3 is an enlarged side elevational view illustrating one of the converted rolls;

FIGURE 4 is an enlarged sectional view taken substantially on line 4—4 of FIGURE 3;

FIGURE 5 is an enlarged fragmentary sectional view taken substantially on the line 5—5 of FIGURE 3; and FIGURE 6 is an enlarged cross-sectional view taken substantially on line 6—6 of FIGURE 3.

FIGURES 7 and 8 illustrate a modification;

FIGURE 7 being a side elevation and,

FIGURE 8 an enlarged fragmentary section taken substantially on line 8—8 of FIGURE 7.

Describing the invention in detail and having particular reference to the drawings there is shown a hay conditioner generally designated 2 which comprises an ambulatory frame 3 having a transverse frame structure 4 and a pair of side supports 5 and 6 which are upright vertical panels.

The panels 5 and 6 are provided with coaxial journals or bearings 7 and 8 which journal the center shaft 9 of the lower roll generally designated 10 which is disposed generally horizontally transverse to the direction of movement of the machine.

The roll 10 cooperates with an upper roll 12 between which there is formed an intake bite 13 which, pursuant to the rotation of the rolls 10 and 12 in the direction of the arrows as indicated in FIGURE 1, admits the hay or the crop picked up by the rolls from the ground to be conditioned between the opposing rollers 10 and 12 and discharges the material rearwardly of the machine as is well known to those skilled in the art. The upper roller 12 comprises a body of elastomer material which is suitably connected to a center shaft 16 which is rotatably supported at each end on a journal 17 which is mounted on a carrier or support arm 18 disposed outwardly of the respective side members 5 and 6. Each arm 18 is pivoted at its rear end on a pin 20 which is carried from the associated side frame structure and the forward end of each arm 18 is provided with a pivot 21 which connects to the lower end 22 of a biasing means generally designated 23, said biasing means 23 having its forward upper end 25 pivoted on a pin 26 from the bracket 27 on the shoe structure 28 which is underposed with respect to the associated side member 5 or 6 and extends forwardly and upwardly therefrom. The bracket 27 is connected with assembly 23 through the pin 26 to a frame member 30 which is disposed alongside each side member 5 and 6 and connected thereto as by bolts 32. It will be realized that the structure herein described is adequately shown and described in U.S. Patent #3,039,256.

The drive for the rollers is provided by a pulley 40 which is supported from the upstanding portion 42 of the side member 5, through a drive shaft 43 which is suitably journaled in the bearing 44, the shaft 43 terminating at a gearbox 45 which comprises a bevel gear set as well known to those skilled in the art and which is driven by the power take-off shaft structure 47 which is carried from the draft tongue 48 by means of which the conditioner is connected to the associated towing vehicle.

As best seen in FIGURES 2 and 6 of the drawings there is provided a novel rib structure or assembly generally designated 50 for the lower roll 10 which comprises a body of elastomer material 51 suitably secured to the shaft 9 which is carried from the bearing structures 7 and which is connected to a pulley 54 which is engaged and wrapped around by belt 55, said belt 55 being back-wrapped with its forward run 56 against the back side of the pulley 58 which is connected to the shaft 16 of the upper roll 12.

The conventional arrangement in the present machine comprises running the rolls in opposing relation and crushing the hay between the grooved rubber or elastomer bodies which may be of tire carcass discs as disclosed in U.S. Patent No. 2,921,426.

It has been found, however, that under certain circumstances it is desirable to provide a crimping effect on the hay passing through the rolls and also that it is necessary to increase the aggressiveness of the lower roll over and beyond the helical grooves 55 thereof for better pick-up.

The present invention comprises the provision of a conversion structure or assembly 50 which includes a plurality of metal bars 56 which are preferably helical of about a half turn in the entire length of the roll. The structure of the conversion package as heretofore mentioned comprises a plurality of rigid helical bars 56 each of which may have an arcuate internal edge 58 and a substantially flate outer edge 59. The inner edge portion 58 is adapted to fit or nest into a helical groove 55 which is formed within the outer periphery of the body portion 51 of the lower roller 10. The bars 56 are retained by a plurality of annular clamps 62, each clamp or ring or steel annulus comprising a pair of opposing semi-circular halves 63 and 64, the portion 63 providing an eye 65 at each end and the portion 64 providing a hook 66 at each end which is adapted to pass into the associated eye and hook behind the lip 67 thereof. It will be appreciated that inasmuch as the structure of the body portion 51 is of resilient elastomer material such as rubber or fiber impregnated tire carcass material that the clamp portions are adapted to receive the body portion therebetween while embracing the plurality of bar members 56 by overcompressing the elastomer, the hooks are entered into the eyes and upon release the expansion of the elastomer holds the parts in place. Each clamp portion comprises a plurality of recesses or notches 68 commensurate in number with the bars and enter into notches 69 in the bars. Thus the rings are prevented from rotating with respect to the bar portions and the bar portions are prevented from moving laterally with respect to the rings and the entire conversion assembly is thus held together. If desired, the bar members 56 may be provided with a plurality of pins or nubs 72 which may project into complementary openings 73 in the body portion 51 of the roll 10 as to prevent endwise movement of the entire assembly.

In FIGURES 7 and 8 wherein parts identical with those of the previous embodiment are identified by corresponding reference numerals it will be appreciated that the instant structure is in essence similar to that previously shown except for the fact that the bars herein shown identified as 56a are straight, that is, parallel to the axis of the center shaft 52 of the roll. In all other respects, the structure may be identical except that the clamp halves may each be provided with a plurality of auxiliary bars 80 which may be integrally united with the clamp portions such that three of the clamp portions may be integrally united and thus they are all interlocked with each other, and furthermore, the number of bars may be increased or diminished depending on the number of the auxiliary bars which may be provided.

I claim:

1. A hay conditioning roller comprising a shaft and a body of elastomer material thereon with peripheral elongated helical grooves therein, a metal bar nested in each groove and projecting outwardly of the periphery of the body, and means securing the bars against said body, said shaft projecting beyond the axial ends of the body and said securing means allowing movement of said bars radially relative to the shaft.

2. A hay conditioning roller comprising a center shaft and a body of yieldable material thereon, and elongated metal bars axially disposed about and projecting radially outwardly of the periphery of the body and compressing the body therebetween, and means removably securing said bars against the body, said shaft projecting beyond the axial ends of the body.

3. The invention according to claim 2, and said securing means comprising annular members surrounding the roller and having notches therein receiving and circumferentially spacing said bars.

4. The invention according to claim 2 and said securing means comprising split rings clamped about said bars.

5. The invention according to claim 4 and said rings and bars having means interlocking each other against axial displacement.

6. The invention acording to claim 4 and said means comprising interfitting notches in said rings and bars.

7. The invention according to claim 2 and said bars having positioning portions and said body having peripheral openings receiving said positioning portions for interlocking the bars with the body.

8. In a hay conditioner of the type comprising a pair of cooperatively associated rollers adapted to receive and pass hay therebetween, at least one of said rollers having a body of resilient material, and a rib forming conversion assembly adapted for mounting upon said one roller comprising a plurality of metallic rib elements elongated axially of the rollers, and means removably securing said rib elements under radial compression against said one roller, said elements projecting radially outwardly of the one roller.

9. The invention according to claim 8 wherein both of said rollers are formed of resilient elastomer material and said conversion assembly is secured solely to said elastomer material.

10. For use in a hay conditioner of the type comprising a pick-up roller having a shaft, and a cooperating roller normally adapted to receive, crush and pass hay therebetween, said pick-up roller having a body of elastomer material on the shaft, said rollers adapted to pick up precut hay directly off the field, and means aiding the picking ability of said rollers comprising a plurality of bars elongated axially of the rollers and disposed about the periphery of the pick-up roller, and means securing said bars against the surface of the pick-up roller whereby said bars are adapted to rotate with the pick-up roller, said elastomer material allowing the bars to move radially with respect to the shaft of the pick-up roller.

References Cited by the Examiner

UNITED STATES PATENTS

| 2,003,990 | 6/35 | Carlson | 174—106 |
| 2,106,060 | 1/38 | Ostrander | 174—108 |
| 2,172,130 | 9/39 | Powell | 138—110 |
| 2,552,168 | 5/51 | Goolsby | 152—228 |
| 2,561,910 | 7/51 | Coffey | 152—208 |
| 2,921,426 | 1/60 | Heth | 29—121 |
| 3,039,256 | 6/62 | Witt | 56—1 |

FOREIGN PATENTS

| 543,693 | 7/57 | Canada. |
| 783,064 | 9/57 | Great Britain. |

WALTER A. SCHEEL, *Primary Examiner.*

JOSEPH D. BEIN, *Examiner.*